US006667812B1

(12) United States Patent
Sato et al.

(10) Patent No.: US 6,667,812 B1
(45) Date of Patent: *Dec. 23, 2003

(54) INFORMATION PROCESSING APPARATUS WITH DEVICE CONTROL LANGUAGE BASED PROGRAM SELECTION

(75) Inventors: Nobuhiko Sato, Yokohama (JP); Satoshi Nagata, Tama (JP); Yoshifumi Okamoto, Yokohama (JP); Tetsuya Morita, Kawasaki (JP); Akihiro Shimura, Toyko (JP); Shunya Mitsuhashi, Tokyo (JP); Takanori Nishijima, Tokyo (JP); Masaki Unishi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 230 days.

(21) Appl. No.: 08/076,785

(22) Filed: Jun. 15, 1993

(30) Foreign Application Priority Data

Jun. 19, 1992 (JP) ............................................. 4-186357
May 26, 1993 (JP) ............................................. 5-124189

(51) Int. Cl.$^7$ .............................................. G06K 15/00
(52) U.S. Cl. ..................................... 358/1.15; 358/1.13
(58) Field of Search ................................ 395/114, 112, 395/200, 325, 500, 113, 500.44–500.49, 280, 200.1, 200.3, 200.47, 200.8, 200.9, 200.2, 285, 291, 309, 311; 400/61–65, 76, 67, 70–71; 358/407, 467, 468, 1.14, 1.15, 1.13; 703/23, 24, 25, 26, 27, 28; 710/100, 105, 111, 129, 131; 709/200, 217, 250

(56) References Cited

U.S. PATENT DOCUMENTS

| 5,031,115 | A | | 7/1991 | Hayashi ...................... 364/519 |
| 5,075,875 | A | | 12/1991 | Love et al. .................. 395/117 |
| 5,228,118 | A | * | 7/1993 | Sasaki ......................... 395/112 |
| 5,353,388 | A | * | 10/1994 | Motoyama .................. 395/117 |

FOREIGN PATENT DOCUMENTS

| JP | 1125663 | * | 6/1986 |
| JP | 1-277929 | | 11/1989 |
| JP | 2-178725 | | 7/1990 |
| JP | 2-231622 | | 9/1990 |
| JP | 3-158924 | | 7/1991 |
| JP | 4-43063 | | 2/1992 |
| JP | 4-83663 | | 3/1992 |
| JP | 5-11943 | | 1/1993 |

* cited by examiner

Primary Examiner—Gabriel Garcia
(74) Attorney, Agent, or Firm—Fitzpatrick, Cella, Harper & Scinto

(57) ABSTRACT

An information processing apparatus acquires identification information which specifies an interpreting program for interpreting a device control language, the specified interpreting program being operable in an external device connected to the information processing apparatus. It is discriminated whether a selected first control program corresponds to the device control language interpreted by the specified interpreting program. If it is discriminated that the selected first control program does not correspond to the device control language interpreted by the specified interpreting program, a second control program corresponding to the device control language interpreted by the specified interpreting program is selected from a plurality of control programs. Data is output to the external device using the first control program or, if it is discriminated that the first control program does not correspond to the device control language, the selected second control program.

38 Claims, 13 Drawing Sheets

INFORMATION PROCESSING APPARATUS WITH DEVICE CONTROL LANGUAGE BASED PROGRAM SELECTION

BACKGROUND OF THE INVENTION

1. Field of the Invention

The present invention relates to an information processing apparatus for sending data to an output device, such as a printer, which is connected through a bidirectional interface.

2. Related Background Art

Conventionally, a printer which is connected to a host computer through an interface (e.g., a Centronics interface) analyzes input data from the host computer and develops bit-map data as output data of, e.g., a laser beam printer. The printer then scan-exposes a photosensitive drum with a laser beam modulated on the basis of this developed data, thereby outputting image data.

In the case of a printer with an emulation function, a plurality of printer control language systems (command systems) can be processed; the printer can execute printing while switching an emulation mode and a native mode in accordance with application programs that a user executes. The printer of this type has switches for switching programs for interpreting the printer control languages and card slots for giving switching designation.

The printer of the above type, however, has no function of checking compatibility of a language environment, which is preset in the printer, before starting printing. Therefore, if printing is started by transferring print data to the printer notwithstanding that the language environment preset in the printer differs from the language environment that an application has set, unexpected results are printed.

As described above, under a print system environment in which printer control languages are selectively used (i.e., an environment in which a plurality of printer drivers can be selectively executed), a printer control language to be used is determined in accordance with a hardware environment set by a user. Therefore, if the printer control language environments of a host computer and a printer do not match each other, a printing failure occurs because there is no relieving means for obtaining matching. When the printer is located apart from the host computer and print data with a large number of pages is processed, a user does not notice the situation at once, resulting in a serious problem of waste of a paper resource due to unnecessary printing.

In addition, in switching between the language environments as described above, if a memory environment is freed, the contents (forms, user fonts, and the memory setting of a RAM) set in a memory of a printer are erased by rewriting. Therefore, even when the same language environment is selected again, not only the information about the forms, the user fonts, and the like but the memory map of the RAM cannot be reproduced correctly. This makes it impossible to ensure the printing under the environmental status before the switching.

If, on the other hand, the memory environment is controlled in such a manner as to keep the status before the language environments are switched, a memory space usable after the switching is rather limited. This significantly decreases the recording efficiency in the environment after the switching.

SUMMARY OF THE INVENTION

The present invention has been made to solve the above problems, and has as its object to provide an information processing apparatus capable of determining matching between an environmental setting status and a printer connected through a bidirectional interface and automatically selecting a printer driver which is compatible to the printer control language data of the printer, thereby obtaining the matching between of a printer environment and the printer that is connected to allow communications and to provide an information processing apparatus capable of managing registration of printer environment information set in a memory of a printer connected through a bidirectional interface by monitoring the environment switching status with respect to the printer, thereby managing the printer environment for each language that is set once with good reproducibility with respect to the printer.

In order to achieve the above object of the present invention, there is provided an information processing apparatus comprising acquiring means for acquiring information stored in a memory of a printing device connected through a bidirectional interface, and selecting means for selecting a printer driver corresponding to the information acquired by the acquiring means from a plurality of printer drivers on the basis of the information.

In addition, in order to achieve the above object of the present invention, there is provided an information processing apparatus comprising storing means for acquiring and storing data stored in a memory of a printing device connected through a bidirectional interface, and transferring means for transferring the data stored in the storing means in order to store the data in a memory of the printing device when the printing device executes processing on the basis of data different from the data stored in the storing means.

DESCRIPTION OF THE PREFERRED EMBODIMENTS

Before an explanation of the arrangement of this embodiment, the arrangements of a laser beam printer and an ink jet printer suitable for this embodiment will be described below with reference to FIGS. 1 to 3. Note that a printer to which this embodiment is applied is not limited to the laser beam printer and the ink jet printer but may be a printer of another printing system.

Figure 1:
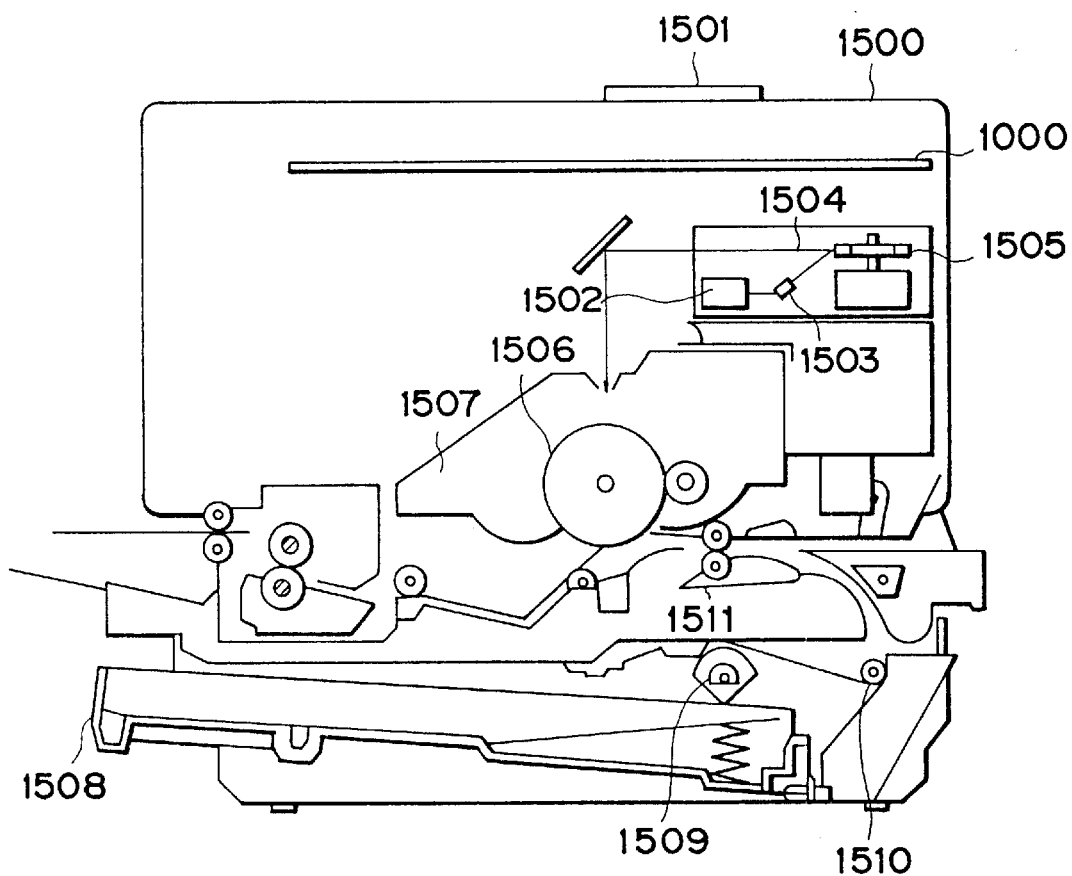
FIG. 1 is a sectional view showing the arrangement of a first recording apparatus to which the present invention is applicable.

FIG. 1 is a sectional view showing the arrangement of a first recording apparatus, for example, a laser beam printer (LBP), to which the present invention is applicable.

Referring to FIG. 1, an LBP main body or printer 1500 receives and stores print information (e.g., character codes), form information, or macro instructions supplied from an externally connected host computer. The LBP main body 1500 forms character patterns or form patterns corresponding to the input information and forms images on recording paper as a recording medium. The LBP main body 1500 includes an operation panel 1501, on which switches and LED indicators for operations are arranged, and a printer control unit 1000 for controlling the overall LBP main body 1500 and analyzing character information and the like supplied from the host computer. The printer control unit 1000 primarily converts character information into a video signal with the corresponding character pattern and applies the signal to a laser driver 1502. The laser driver 1502 is a circuit for driving a semiconductor laser 1503; the laser driver 1502 switches on and off a laser beam 1504 emitted from the semiconductor laser 1503 in accordance with the input video signal. The laser beam 1504 scan-exposes an electrostatic drum 1506 while being oscillated sideways by a rotary polygon mirror 1505. As a result, an electrostatic latent image of the character pattern is formed on the electrostatic drum 1506. This latent image is developed by a developing unit 1507 arranged around the electrostatic drum 1506 and transferred onto recording paper. Cut sheets are used as the recording paper, and these cut sheets are housed in a paper cassette 1508 attached to the LBP main body 1500. The cut sheets are fed into the printer and supplied to the electrostatic drum 1506 by a paper supply roller 1509 and paper feed rollers 1510 and 1511. The LBP main body 1500 also has at least one card slot (not shown) through which optional cards and control cards (emulation cards) for different language systems can be connected and used, in addition to internally stored fonts.

Figure 2:
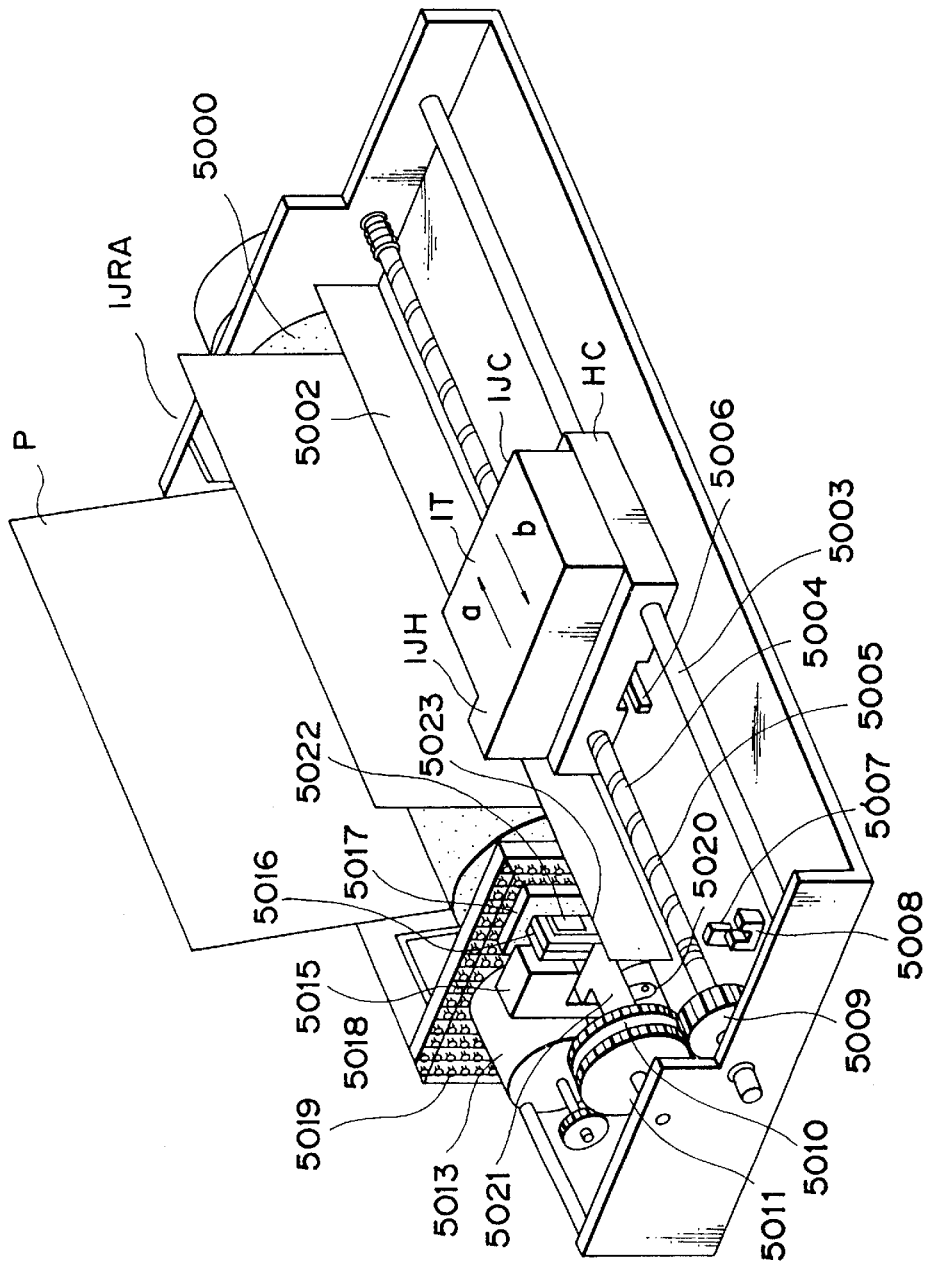
FIG. 2 is a perspective view showing the outer appearance of a second recording apparatus to which the present invention is applicable.

FIG. 2 is a perspective view showing the outer appearance of a second recording apparatus, for example, an ink jet recording apparatus (IJRA), to which the present invention is applicable.

Referring to FIG. 2, a carriage HC engaging with a spiral groove 5004 of a lead screw 5005 which is rotated in association with the forward and backward rotations of a drive motor 5013 via driving force transmission gears 5011 and 5009 has a pin (not shown) and is therefore reciprocated in directions indicated by arrows a and b. An ink jet cartridge IJC is mounted on the carriage HC. A paper holding plate 5002 urges paper against a platen 5000 over the full width in the carriage moving direction. Photocouplers 5007 and 5008 function as home position detecting means for checking the presence of a lever 5006 of the carriage in this area and performing switching between the rotational directions of the motor 5013. A support member 5016 supports a cap member 5022 for capping the entire surface of a recording head, and a sucking means 5015 for sucking the interior of the cap to perform suction-recovery for the recording head through an opening 5023 inside the cap. A cleaning blade 5017 can be moved forward and backward by a member 5019. A main body support plate 5018 supports the members 5017 and 5019. A lever 5012 for starting suction of the suction-recovery moves in association with the movement of a cam 5020 which engages with the carriage, controlling the driving force from the drive motor through a known transmitting means, such as clutch switching.

The apparatus is arranged such that capping, cleaning, and suction-recovery can be performed at their respective positions by the action of the lead screw 5005 when the carriage moves to an area on the home position side; that is, a desired operation need only be performed at a timing known to those skilled in the art.

Figure 3:
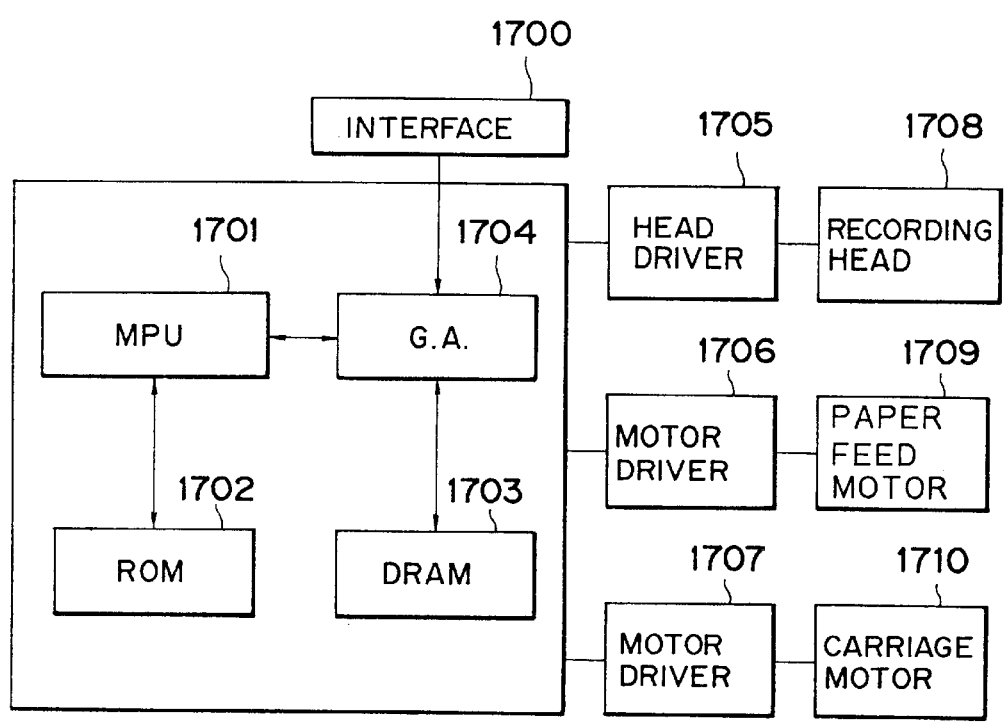
FIG. 3 is a block diagram for explaining the control system of the second recording apparatus shown in FIG. 2.

FIG. 3 is a block diagram for explaining the control system of the second recording apparatus shown in FIG. 2.

Referring to FIG. 3, this control system includes an interface 1700 for applying recording signals, an MPU 1701, a program ROM 1702 for storing, e.g., control programs to be executed by the MPU 1701, and a DRAM 1703 for storing various data (such as the recording signals and recording data to be supplied to a head). A gate array 1704 controls the supply of the recording data to a recording head 1708 and also controls the transfer of data between the interface 1700, the MPU 1701, and the DRAM 1703. A carriage motor 1710 carries the recording head 1708, and a paper feed motor 1709 feeds recording paper. A head driver 1705 drives the recording head, a motor driver 1706 drives the paper feed motor 1709, and a motor driver 1707 drives the carriage motor 1710.

In the recording apparatus with the above arrangement, when a recording signal is applied from a host computer 100 (to be described later) through the interface 1700, this recording signal is converted into recording data for printing by the gate array 1704 and the MPU 1701. Then the motor drivers 1706 and 1707 are driven, and the recording head is also driven by the recording data supplied to the head driver 1705, thereby executing printing.

The MPU 1701 can perform communications with the host computer 100.(to be described later) through the interface 1700; the MPU 1701 can inform the host computer 100 (to be described later) of memory information related to the DRAM 1703 and resource data and can also communicate with a printer connected to the host computer 100 to automatically determine the environmental setting status of that printer, thereby automatically setting printer environments matching each other.

The MPU 1701 can also transfer data set in the memory of the printer to the host computer 100, as a temporary registration file, when switching is performed between printer control languages. When printing is finished after the switching between the printer control languages, the MPU 1701 transfers the temporary registration file back to the printer to reset the data, thereby restoring the printer environment of the printer.

1st Embodiment

Figure 4:
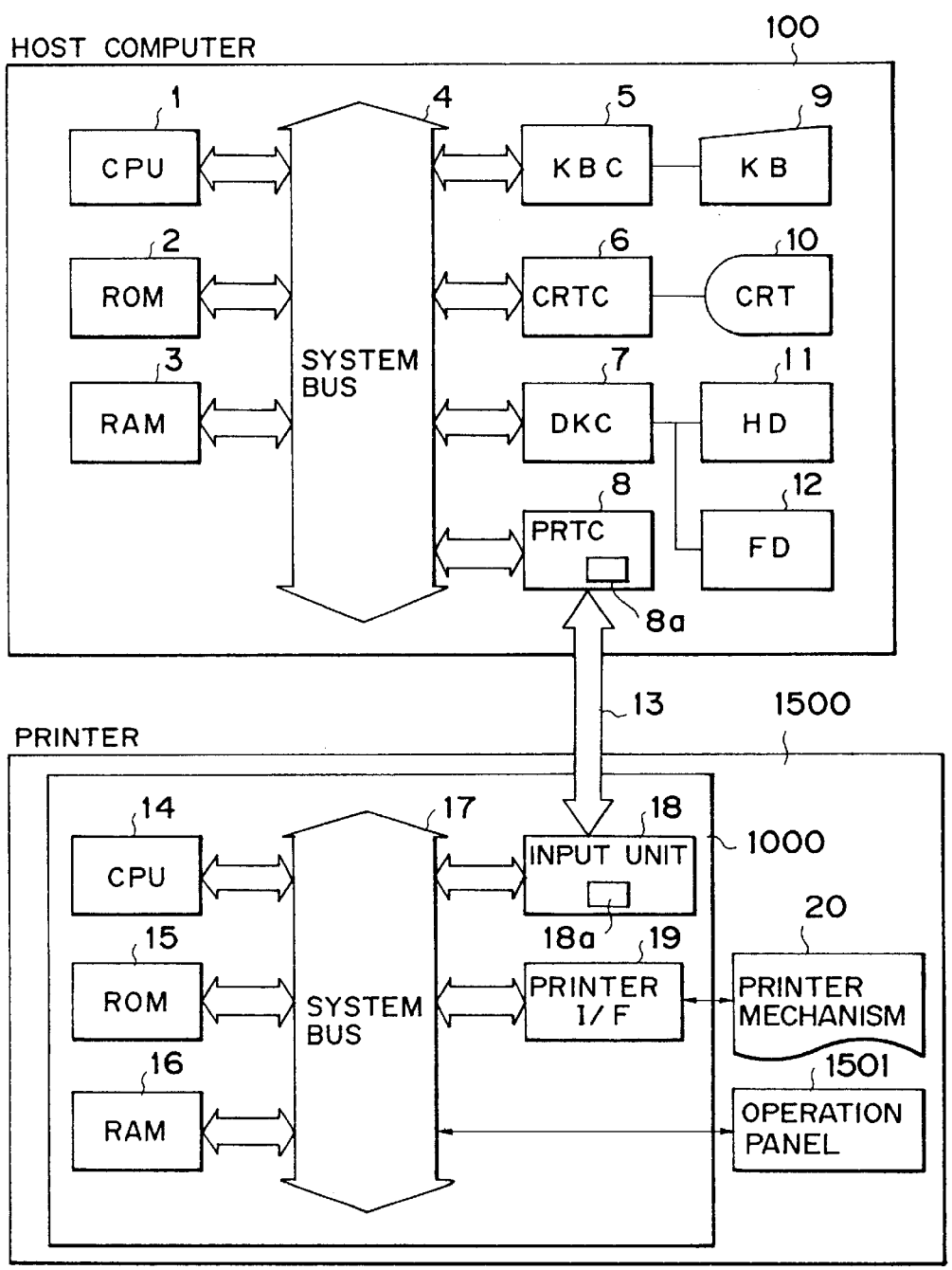
FIG. 4 is a block diagram for explaining the arrangement of a printer control system according to the first embodiment of the present invention.

FIG. 4 is a block diagram for explaining the arrangement of a printer control system according to the first embodiment of the present invention. The first embodiment will be described below by taking the laser beam printer (FIG. 1) as an example. Note that the present invention can be applied to any of a single apparatus, a system comprising a plurality of apparatuses, and a system in which processing is executed via a network, such as a LAN, provided that the functions of the present invention are executed.

Referring to FIG. 4, the host computer 100 has a CPU 1 for executing processing for documents consisting of graphics, images, characters, tables (including spreadsheets), and the like on the basis of document processing programs stored in a ROM 2. The CPU 1 systematically controls individual devices connected to a system bus 4.

The ROM 2 stores the control programs of the CPU 1 shown in the flow charts of FIGS. 6, 9, 11, 12, and 13. A RAM 3 serves as a main memory and a work area for the CPU 1. A keyboard controller (KBC) 5 controls key inputs from a keyboard 9. A CRT controller (CRTC) 6 controls a display on a CRT display (CRT) 10. A disk. controller (DKC) 7 controls access to a hard disk (HD) 11 and a floppy disk (FD) 12 which store boot programs, various applications, font data, user files, edit files, and a printer driver file 11a (to be described later). A printer controller (PRTC) 8 is connected to the printer 1500 through a predetermined bidirectional interface (interface) 13 and executes processing for controlling communications with the printer 1500. Interface circuits 8a and 18a control command communication processing and recording information processing executed between the printer 1500 and the host computer 100 through the interface 13.

The CPU 1 executes processing for developing (rasterizing) an outline font into a display information RAM set in the RAM 3, allowing WYSIWYG on the CRT 10. The CPU 1 also opens various registered windows on the basis of commands designated by a mouse cursor or the like on the CRT 10, executing various tasks of data processing.

In the printer 1500, a printer CPU 14 systematically controls access to various devices connected to a system bus 17 on the basis of control programs and the like stored in a ROM 15 and outputs image signals as print data to a printer mechanism (printer engine) 20 connected through a printer interface 19. The CPU 14 can also execute communications with the host computer via an input unit 18, informing the host computer 100 of memory information concerning a RAM 16, resource data, and the like. The RAM 16 functions as a main memory and a work area for the CPU 14. The memory capacity of the RAM 16 can be extended by an optional RAM connected to an expansion port. Note that the RAM 16 is used as a recording data development area 16b, an environment data storage area 16a, an NVRAM, and the like to be described later.

The printer control system also includes at least one card slot (not shown) so that optional font cards and cards (emulation cards) storing programs for interpreting printer control languages of different language systems can be connected and used, in addition to internally stored fonts. Furthermore, the printer control system has an NVRAM (not shown) for storing printer mode set information from the operation panel 1501.

In the printer control system with the above arrangement, when the CPU 1 acquires, at a predetermined timing, information concerning the printer control language stored in the RAM 16 (to be described later) of the printer 1500 connected to the host computer through the bidirectional interface 13, the CPU 1 analyzes the acquired information related to the printer control language, designating switching between the printer drivers. In accordance with this switching designation, the CPU 1 sets the matching printer driver environment in the host computer 100. Therefore, even if the printer environment of the host computer does not match that of the printer connected to allow communications between them, the matching printer environment is automatically set. Note that the information concerning the printer control language is either a program (emulation program) for interpreting a printer control language, which is stored in the ROM 15 of the printer 1500, or a program (emulation program) for interpreting a printer control language, which is stored in the emulation card described above.

More specifically, when drivers (corresponding to different printers) for a plurality of printer control language systems can be used in the system in which the host computer 100 and the printer 1500 are connected through the bidirectional interface 13, the CPU 1 of the host computer 100 acquires information (such as identification information for specifying a program for interpreting a particular printer control language) concerning a printer control language from the RAM 16 of the printer 1500. The CPU 1 then checks matching between the control language systems of the printer driver and the printer on the basis of the acquired information in the work area of the RAM 3 of the host computer 100 by referring to a table (showing correspondences between information concerning the printer control languages and the printer drivers). If no matching can be obtained, the CPU 1 obtains matching by switching to a printer driver corresponding to the acquired information. Consequently, a user can perform printing by using an appropriate printer driver without performing selection of the printer driver. In this case, the timing at which the information related to the printer control language is acquired is the timing at which the system is initialized (i.e., a power source switch is turned on) or the printing start timing. Note that the table in the RAM 3 shows printer drivers usable by the host computer 100 and information concerning printer control languages corresponding to the printer drivers. This table is formed when the power source switch of the host computer 100 is turned on.

The printer environmental correspondence setting processing executed by the printer control system according to the present invention will be described below with reference to FIG. 5.

Figure 5:
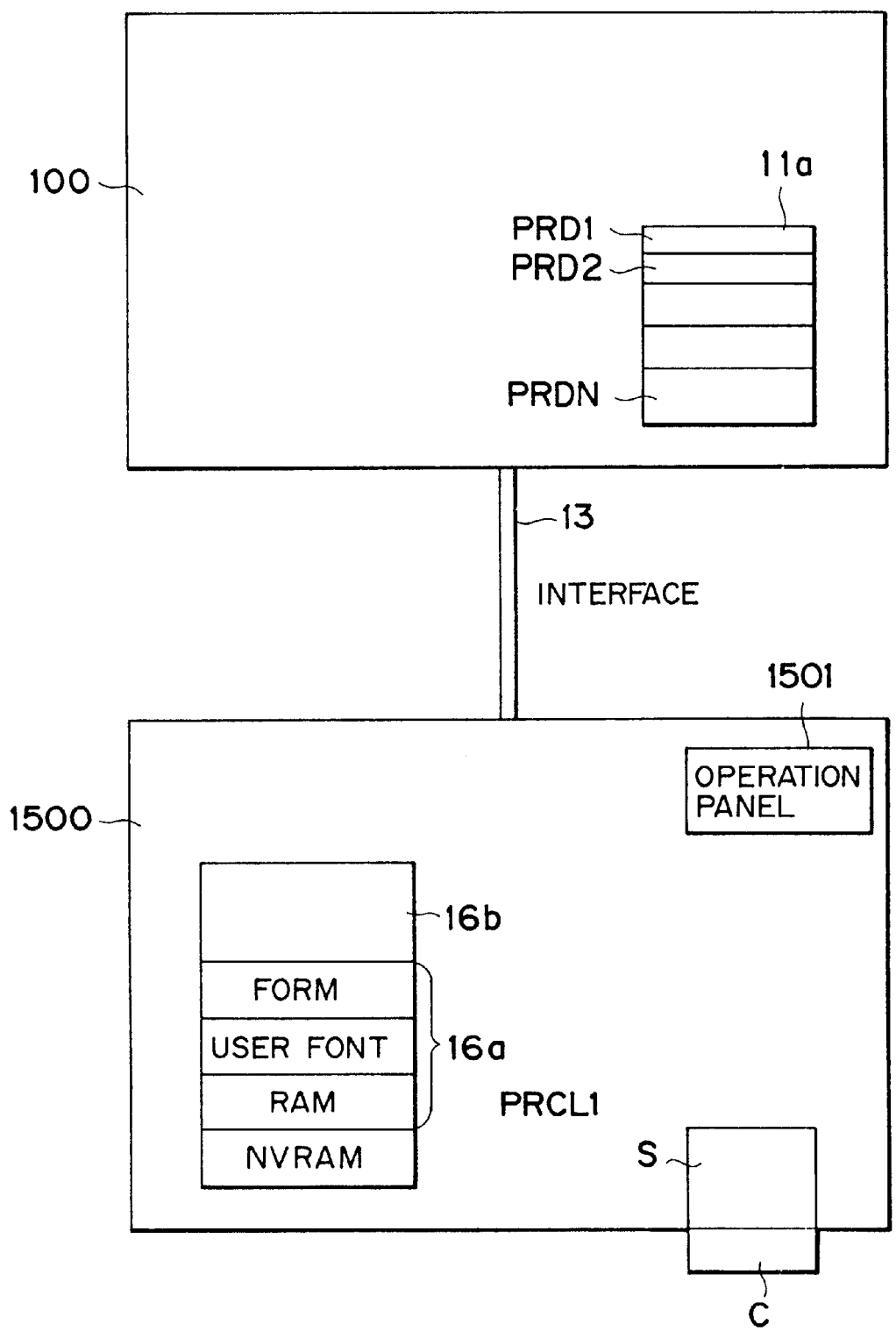
FIG. 5 is a block diagram for explaining environmental setting switching processing executed between a host computer and a printer shown in FIG. 4.

FIG. 5 is a block diagram showing the printer environmental matching setting processing executed between the host computer 100 and the printer 1500 shown in FIG. 4, in which the reference numerals as in FIG. 4 denote the same parts.

Referring to FIG. 5, the printer driver file 11a stores various printer drivers PRD1 to PRDN corresponding to drivable printer control languages. The printer driver file 11a is registered in, e.g., the hard disk 11, and a desirable printer driver can be selected from it. Therefore, printing can be executed by properly switching the printer drivers PRD1 to PRDN on the basis of the information about the printer control language acquired from the printer. The relationship between the printer drivers stored in the printer driver file 11a and the corresponding printer control languages is stored in the above-mentioned table (not shown) in the RAM 3.

An environment data area 16a for, e.g., a first printer language system is an environment data storage area (to be described later) of the RAM 16, which is constituted by form (ruled line) data, user font data, RAM data, and the like. Information (e.g., PRCL1) concerning a currently designated printer control language is set as the RAM data. The operation panel 1501 includes keys for setting various modes and keys for recovery from errors. A control card C which is connected when the printer 1500 is to be activated in an emulation mode is inserted into a card slot S. When this control card C is inserted, PRCL1, for example, is designated, and "PRCL1" is set as the RAM data.

If, however, a plurality of pieces of emulation control information are stored in the ROM 15, information related to a corresponding printer control language designated by, e.g., the operation panel 1501 is set as the RAM data.

Figure 6:
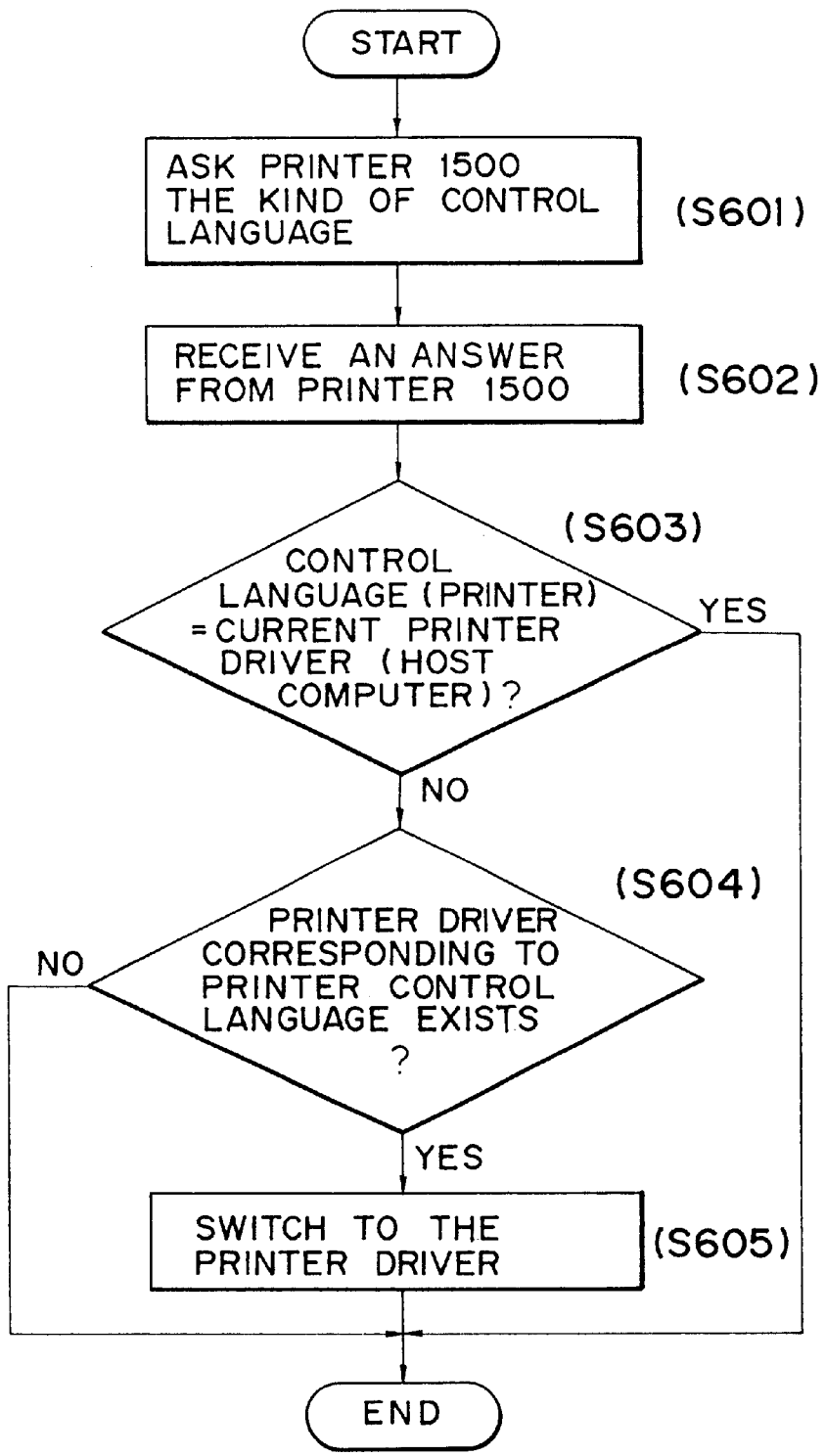
FIG. 6 is a flow chart showing an example of an environmental setting switching procedure according to the first embodiment of the present invention.

FIG. 6 is a flow chart showing a printer environmental correspondence setting sequence according to the first embodiment of the present invention, in which processing steps S601 to S605 are illustrated.

First, in step S601, the CPU 1 designates a printer control language information acquisition request by using a command, as information for asking the printer 1500 the kind of a control language. This designation of the acquisition request is performed when the system is initialized (e.g., when the power source switch is turned on) or when a print start instruction is output. Upon receiving the answer, in step S602, the CPU 1 of the host computer 100 acquires printer control language information from the above-mentioned RAM data area of the RAM 16 of the printer 1500. In step S603, the CPU 1 checks on the basis of the printer control language information acquired, while referring to the above-mentioned table in the work area of the RAM 3, whether a printer driver currently selected by the host computer 100 matches a printer control language currently set in the printer 1500.

If the printer control language in the printer 1500 matches the printer driver in the host computer 100 in step S603, the CPU 1 ends the processing; if not, the flow advances to step S604.

In step S604, the CPU 1 searches for a printer driver corresponding to the printer control language by referring to the above-mentioned table. If the corresponding printer driver exists, the flow advances to step S605; if not, the CPU 1 ends the processing.

In step S605, the CPU 1 designates switching to the corresponding printer driver on the basis of the printer control language information acquired. The matching of the printer driver environment in the host computer is set in accordance with this switching designation, and the processing is ended.

As described above, switching between printer drivers is designated on the basis of printer control language information acquired from the memory (in this embodiment, the RAM 16) of the printer 1500 connected to the host computer 100 through the bidirectional interface 13, and the matching of the printer driver environment in the host computer is set in accordance with this switching designation. Therefore, even when the printer environment of the host computer does not match that of the printer connected to allow communications between them, an optimal printer driver can be selected automatically by setting the corresponding printer environment.

In this embodiment, the matching between the printer environments is automatically determined by the host computer 100. However, the processing for obtaining the matching between the printer environments can also be automatically activated by a control language switching designation from the operation panel 1501 of the printer 1500 or by detecting the status of insertion and removal of the control card C.

In addition, in searching for a combination of a printer driver and a printer control language corresponding to each other, a priority order may be given to a plurality of printer drivers in the host computer 100. Furthermore, the printer control system of the above embodiment has been described by taking the laser beam printer 1500 as an example, but the present invention is also applicable, of course, to the ink jet printer shown in FIGS. 2 and 3 mentioned earlier.

In the above embodiment, the matching is set between the printer environments of the printer 1500 and the host computer 100. In this case, to effectively use the memory (RAM 16) of the printer 1500 for each individual printer control language, it is desirable that the entire area of the memory (RAM 16) of the printer 1500 be freed each time the printer control languages are switched. When the memory is freed, however, the contents already registered are erased. For this reason, the control must be performed in a way which sets the contents already registered in the memory with good reproducibility while effectively making use of the memory. This processing will be described below with reference to the second embodiment of the present invention.

2nd Embodiment

In the block diagram for explaining the arrangement of the printer control system shown in FIG. 4, when a CPU 1 acquires first printer environment data stored in a RAM 16 of a printer 1500 on the basis of the printer environmental switching status, the CPU 1 registers this first printer environment data acquired in a hard disk 11 or a floppy disk 12 as an internal file of a host computer 100. After this data registration performed by the CPU 1, second printer environment data corresponding to a second printer environment is set in an area 16a of the RAM 16 by the communication control function between the CPU 1 and a CPU 14, and the first printer environment data, which is registered in the internal file, is also stored again in the area 16a of the RAM 16 by the same function on the basis of the end status of printing corresponding to the second printer environment. Therefore, even if switching between the printer environments occurs frequently, the contents of printer environment data for each environment can be restored to the RAM 16 with good reproducibility.

More specifically, when a plurality of printer control language systems can be used in a system in which the host computer 100 and the printer 1500 are connected through a bidirectional interface 13, in command mode switching from the first printer environment (first printer language system) to the second printer environment (second printer language system), the first printer environment data (e.g., registered form data and user font data) is transferred from the area 16a in the RAM 16 of the printer 1500 to the host computer 100, and the host computer 100 stores the data in a file, such as the hard disk 11. The printer 1500 releases the first printer environment data storage area 16a of the RAM 16 to perform printing corresponding to the second printer environment. Thereafter, when the command mode is to be returned from the second printer environment to the first printer environment, the first printer environment data stored in the host computer 100 is sent to the printer 1500, restoring the status of the printer 1500 before switching to the second printer environment. This makes it possible to effectively use the resource of the memory (RAM 16) of the printer in performing printing corresponding to the second printer environment, and to automatically restore the status of the print environment data in the RAM 16 before printing when the printing is entirely finished.

The printer memory resource release processing performed in environmental switching by the printer control system according to the present invention will be described below with reference to FIGS. 7 to 9.

Figure 7:
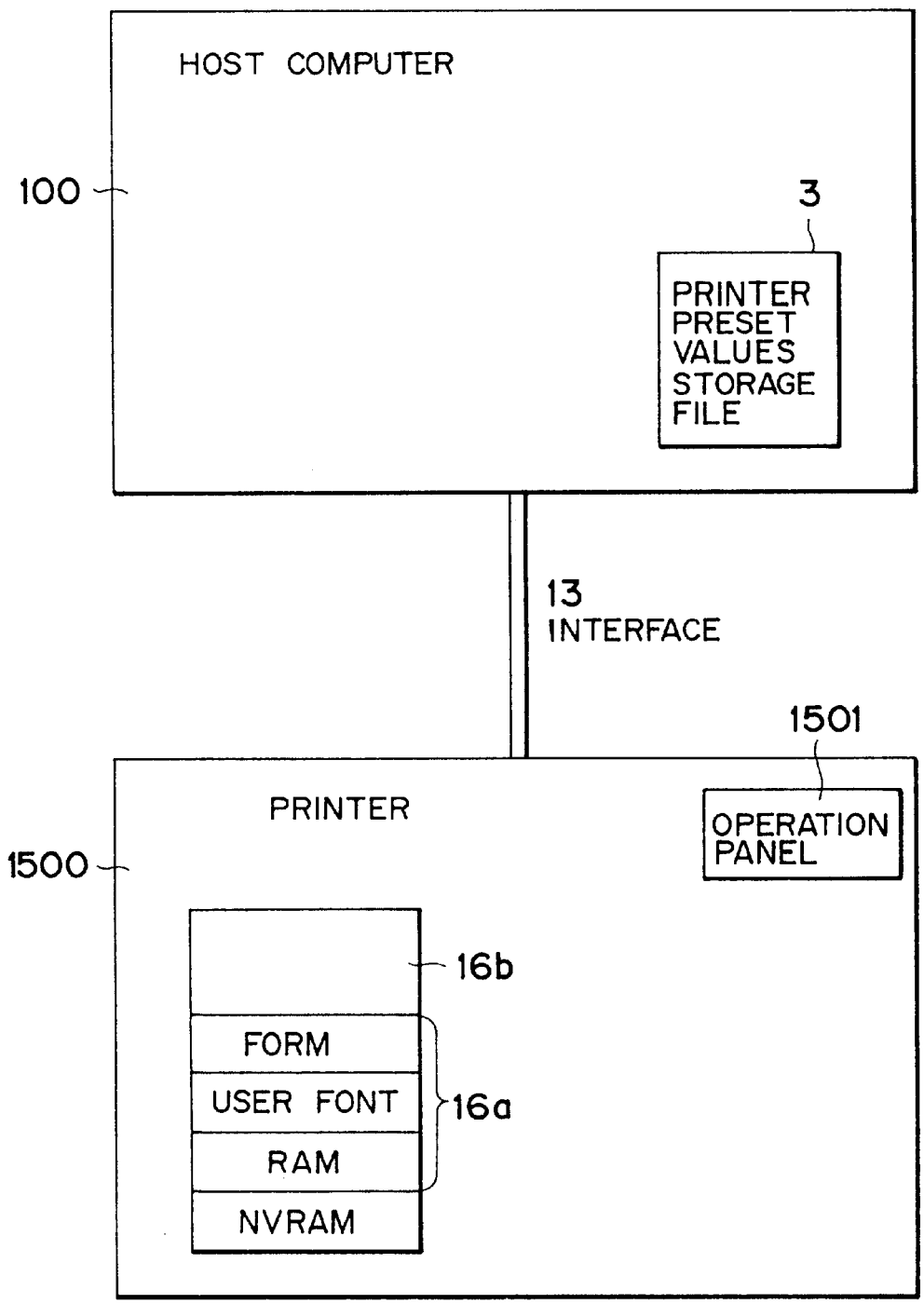
FIG. 7 is a block diagram for explaining the environmental setting switching processing executed between the host computer and the printer shown in FIG. 4.

FIG. 7 is a block diagram for explaining environmental setting switching processing performed between the host computer 100 and the printer 1500, in which the same reference numerals as in FIG. 4 denote the same parts.

Referring to FIG. 7, the environment data storage area 16a for, e.g., a first language system consists of form data (ruled line data), user font data, RAM data for storing, e.g., preset items inherent in a printer, and the like. A recording data development area 16b stores bit-map data in printing or is used as a work area. An NVRAM stores printer mode setting information from an operation panel 1501 (to be described later).

The operation panel 1501 includes keys for setting various modes and keys for recovery from errors.

Figure 8:
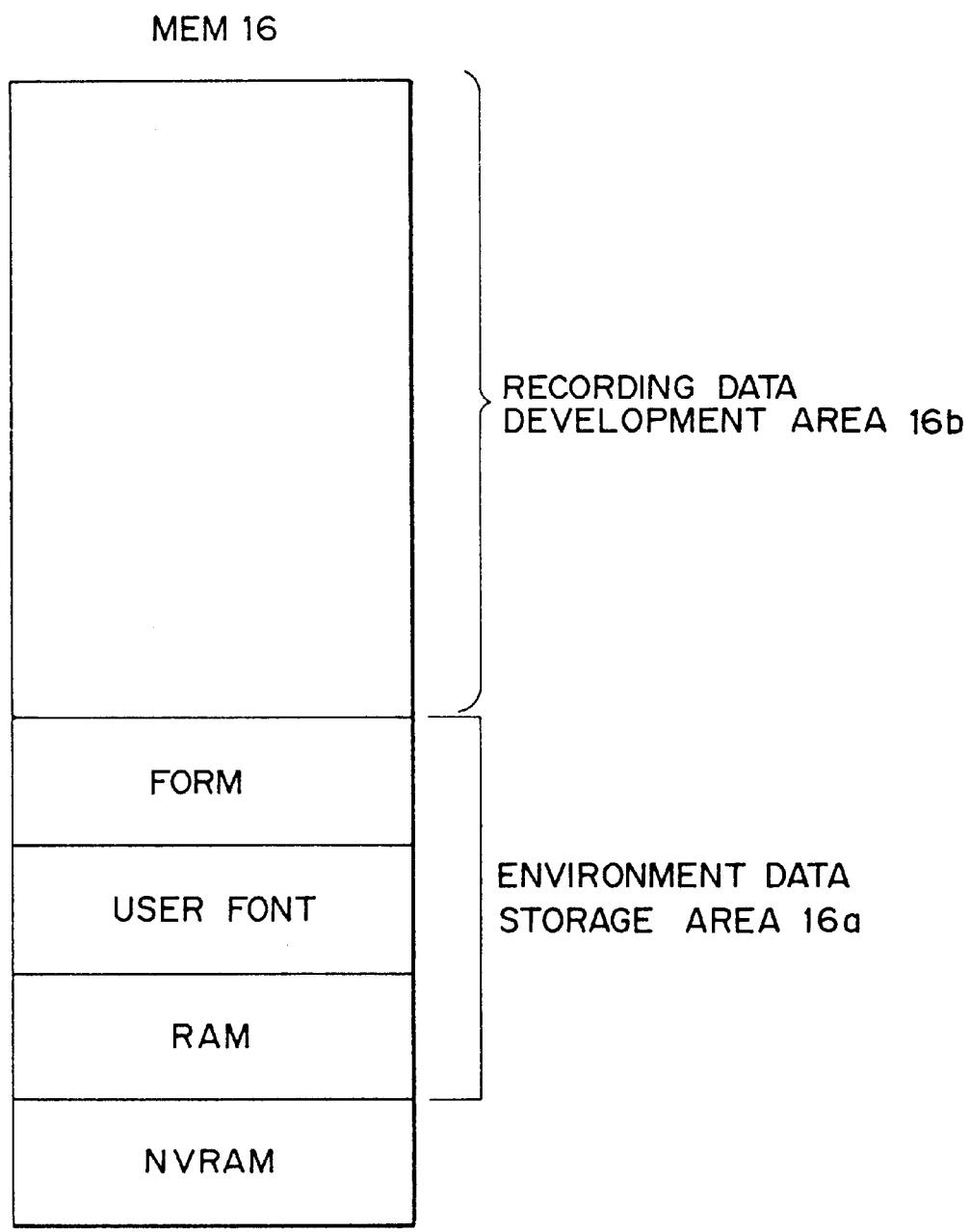
FIG. 8 is a schematic view showing the memory map of a RAM shown in FIG. 7.

FIG. 8 is a schematic view showing the memory map of the RAM 16 shown in FIG. 7.

Figure 9:
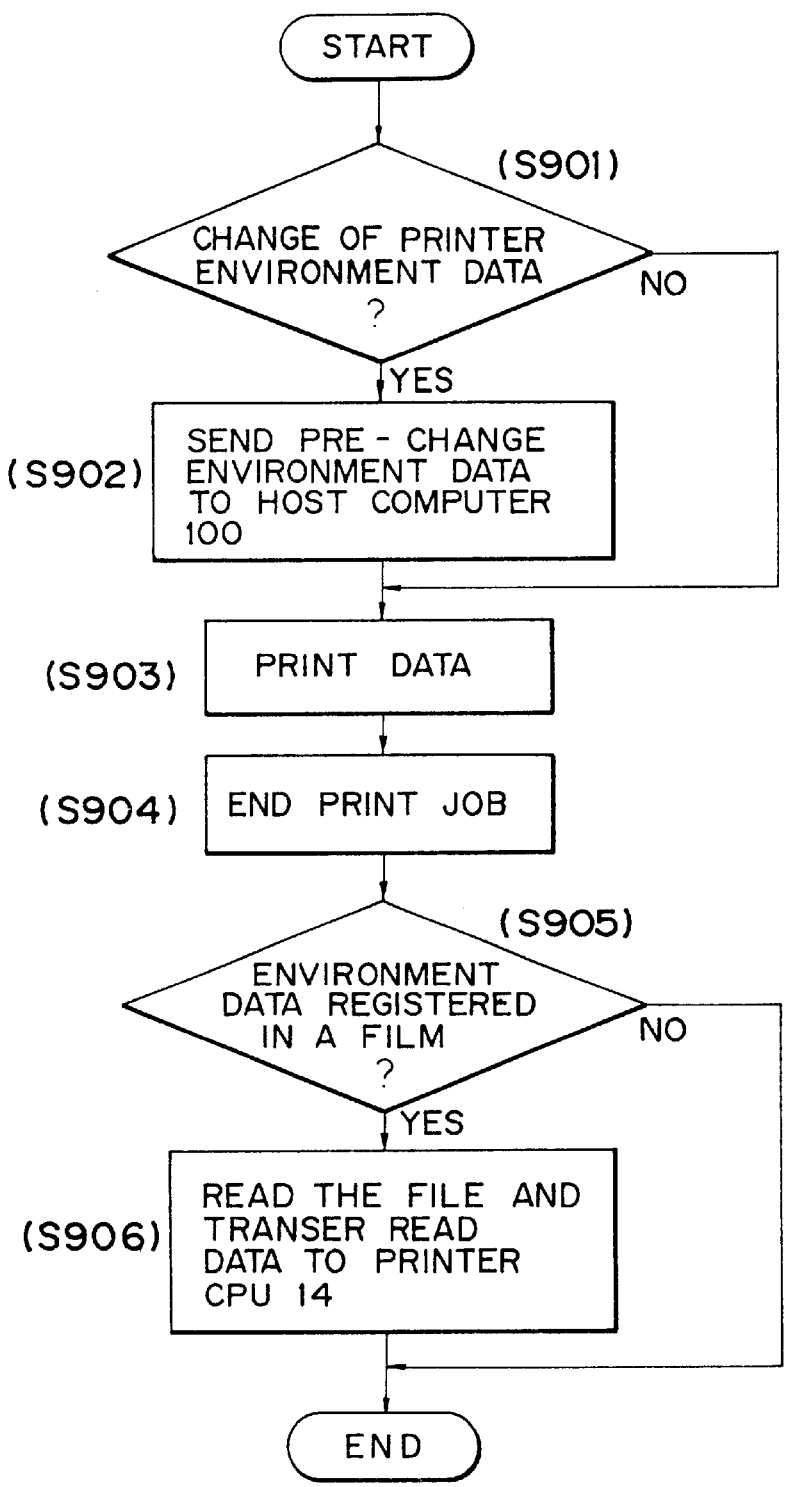
FIG. 9 is a flow chart showing an environmental setting switching sequence according to the second embodiment of the present invention.

FIG. 9 is a flow chart showing an example of an environmental setting switching procedure according to the second embodiment of the present invention, in which processing steps S901 to S906 are illustrated.

First, in step S901, the CPU 1 checks whether a change of printer environment data is designated by a keyboard 9 or a pointing device (not shown). If NO in step S901, the flow advances to step S903 to perform regular printing.

If YES in step S901, the flow advances to step S902, and the CPU 1 designates the CPU 14 to send the contents (e.g., the first printer environment data) stored in the printer environment data storage area 16a of the RAM 16 to the host computer 100.

In response to this designation, in step S902, the CPU 14 of the printer 1500 reads out the contents from the printer environment data storage area 16a and sends pre-change environment data (e.g., the first printer environment data) to the host computer 100, and the host computer 100 stores the data in an internal file. In step S903, the printer environment data storage area 16a is released so that the printer environment (second printer environment) after the environments are switched can effectively use the memory (RAM 16) maximally, and printing is executed by receiving recording information through known communication processing and performing bit map development. When the print job depending on the printer environment after the switching between the environments is ended in step S904, the CPU 1 checks in step S905 whether the environment data (e.g., the first printer environment data) of the printer 1500 is registered as an internal file. If NO in step S905, the CPU 1 ends the processing. If YES in step S905, the flow advances to step S906, and the CPU 1 reads out the registered file and transfers the readout file to the CPU 14 of the printer 1500, thereby resetting the printer environment data storage area 16a of the RAM 16 and reproducing and setting the contents of the RAM 16 corresponding to the status (first printer environment) before the environmental switching. Thereafter, the CPU 1 ends the processing.

As described above, the first printer environment data stored in the memory (RAM 16) of the printer 1500 which is connected to the host computer 100 through the bidirectional interface 13 is acquired on the basis of the printer environmental switching status and registered as an internal file of the host computer 100. After this registration, the second printer environment data corresponding to the second printer environment is set in the memory of the printer, and the first printer environment data registered in the internal file is stored again on the basis of the end status of printing corresponding to the second printer environment. This allows reliable reproduction of the setting status of the memory for each environment upon switching between printer environments.

In addition, since switching between printer environments occurs when printer control language systems are switched, the setting status of the memory for each environment can be reproduced reliably upon switching between the printer control language systems.

Figure 10:
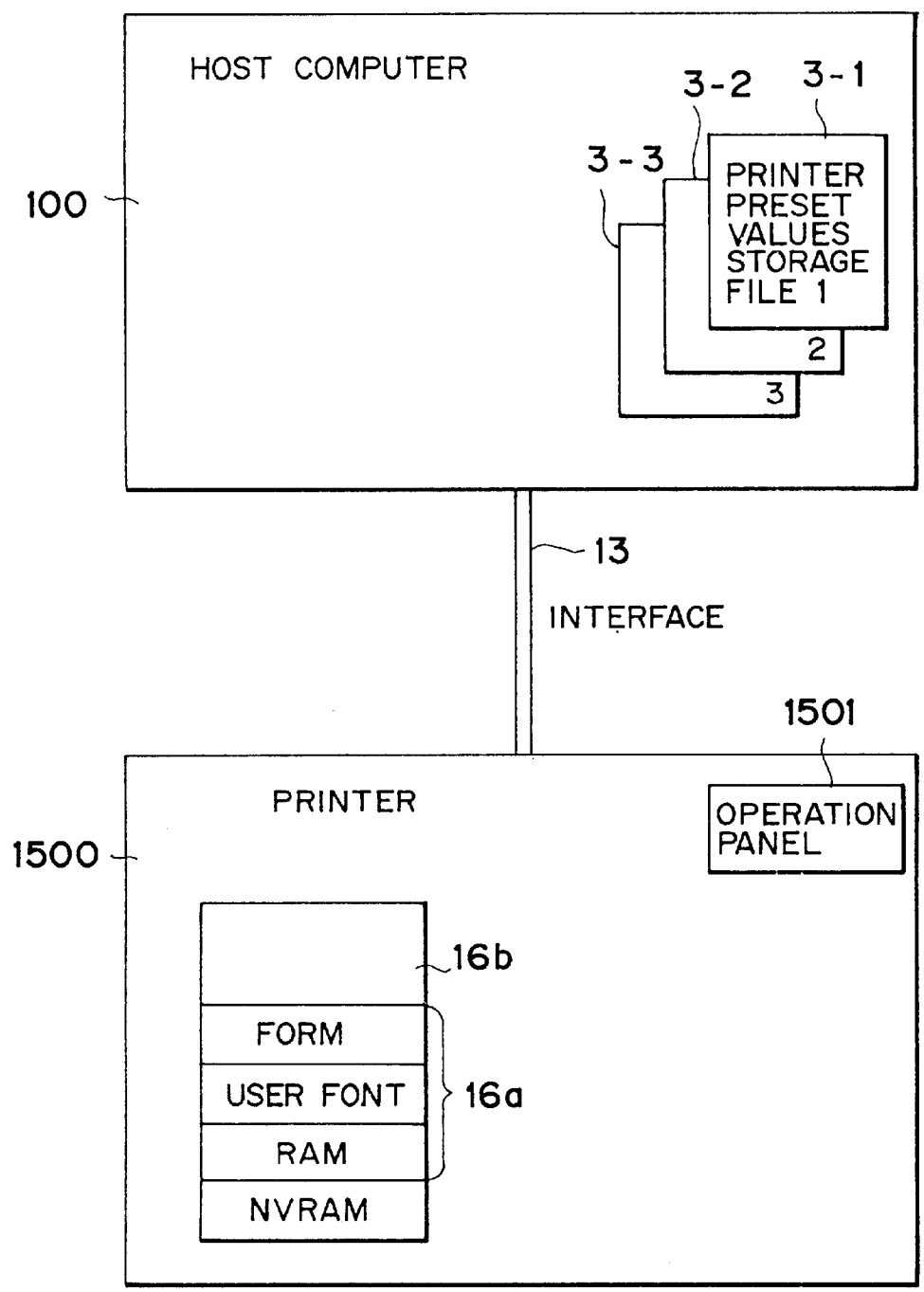
FIG. 10 is a block diagram for explaining another environmental setting switching processing executed between the host computer and the printer shown in FIG. 4.

In the above embodiment, when a request for switching printer control languages is generated by the keyboard 9 or the like of the host computer 100, the printer environment data of the printer 1500 is read out by the host computer 100 and registered as a temporary file. As shown in FIG. 10, however, the system may also be arranged such that when a switching designation is applied from the operation panel 1501 of the printer 1500, a current printer environment is transferred to the host computer 100 and registered as separate registered files 3-1 to 3-3 in the RAM 3 or the hard disk 11. In this case, in accordance with a registered file call from the printer 1500, the separate registered files 3-1 to 3-3 are sent back to the printer 1500 in the order of registration and reproduced in the printer environment data storage area 16a of the RAM 16.

Furthermore, in the above embodiment, the occurrence of switching between printer control language systems in the single host computer 100 is used as the printer setting change condition. The present invention, however, is also applicable to a system shared by a plurality of host computers and a plurality of printers. Alternatiyely, a designation made from the operation panel 1501 by a user may be used as the switching condition. The system may also be arranged such that a plurality of environmental mode set files are set to be usable by the same user and desired printer set information is reproduced in the printer environment data storage area 16a of the RAM 16 by using a designation for calling a desired environmental mode set file as the switching condition. Note that the printer control system of the above embodiment has been described by taking the laser beam printer 1500 as an example, but the present invention is, of course, applicable to the above-mentioned ink jet printer shown in FIGS. 2 and 3 and the like.

3rd Embodiment

The third embodiment of the present invention relates to processing in which, when a priority order is set for a plurality of printer control languages in a printer 1500 in the system of the first embodiment described above, a host computer 100 automatically switches to a printer driver corresponding to a printer control language with the highest priority and also switches a printer control language used in the printer 1500 to the printer control language with the highest priority.

Figure 11:
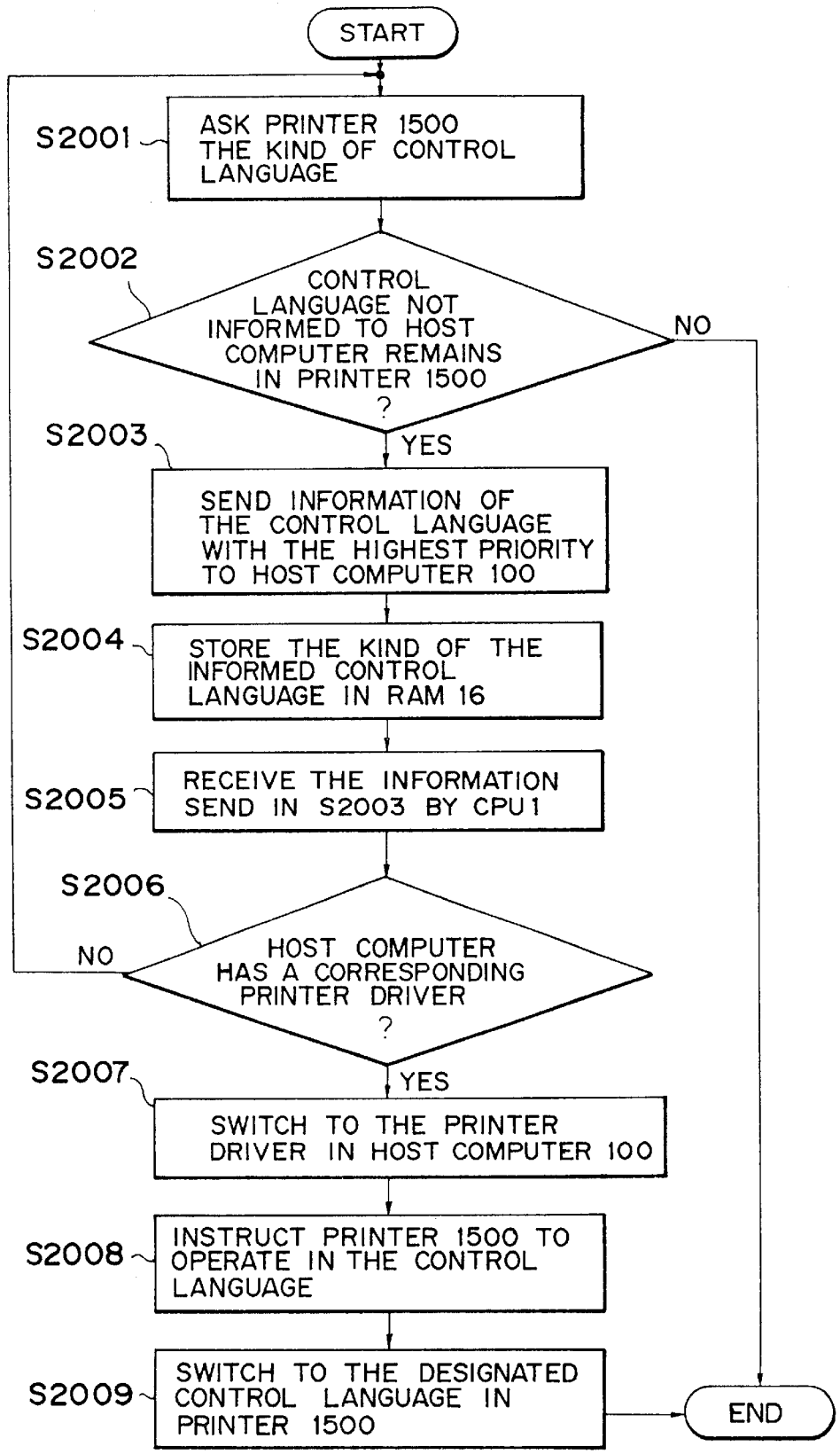
FIG. 11 is a flow chart showing an environmental setting switching sequence according to the third embodiment of the present invention.

FIG. 11 is a flow chart showing an environmental setting switching sequence according to the third embodiment of the present invention.

The processing will be described with reference to the block diagram shown in FIG. 4 for explaining the environmental setting switching processing performed between the host computer 100 and the printer 1500. Note that the priority order of a plurality of printer control languages used in the printer 1500 may be fixed beforehand and stored in, e.g., a ROM 15, or a given priority order may be set at an operation panel 1501 of the printer and stored in, e.g., a RAM 16.

Referring to FIG. 11, in step S2001, a CPU 1 in the host computer 100 asks the printer 1500 the kind of printer control language to which the printer 1500 corresponds, and the flow advances to step S2002.

In step S2002, a CPU 14 in the printer 1500 checks whether printer control languages not informed to the host computer 100 remain in the printer 1500. If YES in S2002, the flow advances to S2003. If NO in step S2002, the processing is ended.

In step S2003, the CPU 14 sends to the host computer 100 information of a printer control language with the highest priority, among other printer control languages not informed to the host computer 100, on the basis of the priority information stored in, e.g., the RAM 16 of the printer 1500, and the flow advances to step S2004. The information of the priority order that is referred to in step S2003 is stored in, e.g., the RAM 16.

In step S2004, the kind of informed printer control language is stored in the RAM 16 of the printer 1500, and the flow advances to step S2005. In this case, management of the information is performed by writing the information in an area assured in the RAM 16.

In step S2005, the CPU 1 of the host computer 100 receives the information sent in step S2003 by the CPU 14 of the printer 1500, and the flow advances to step S2006.

In step S2006, the CPU 1 checks by referring to the table (not shown) explained in the first embodiment whether the host computer 100 has a printer driver corresponding to the printer control language information received in step S2005. If the host computer 100 has the corresponding printer driver in step S2006, the flow advances to step S2007; if not, the flow returns to step S2001.

In step S2007, the CPU 1 of the host computer 100 switches to the corresponding printer driver determined in step S2006 in order to perform printing by using this printer driver, and the flow advances to step S2008.

In step S2008, in order to perform printing by using the corresponding printer control language determined in step S2006, the CPU 1 of the host computer 100 sends an instruction for switching to this printer control language to the printer 1500, and the flow advances to step S2009.

In step S2009, the CPU 14 of the printer 1500 receives the instruction sent in step S2008, switching an operating printer control language to the designated printer control language, and ending the processing.

As described above, the correspondence between a printer control language to which the printer corresponds and a printer driver to which the host computer corresponds is automatically obtained in accordance with the priority order of printer control languages which is determined on the printer side, so correct printing results can be obtained constantly.

4th Embodiment

The fourth embodiment of the present invention relates to processing in which, when a priority order is set for a plurality of printer drivers (stored in, e.g., a hard disk 11 shown in FIG. 4) of a host computer 100 in the system of the first embodiment described above, the host computer 100 automatically switches to a printer driver with the highest priority, among other printer drivers acquired from a printer 1500 and corresponding to printer control language information usable in the printer 1500, and also switches a printer control language used in the printer 1500 to a printer control language corresponding to the selected printer driver accordingly.

Figure 12:
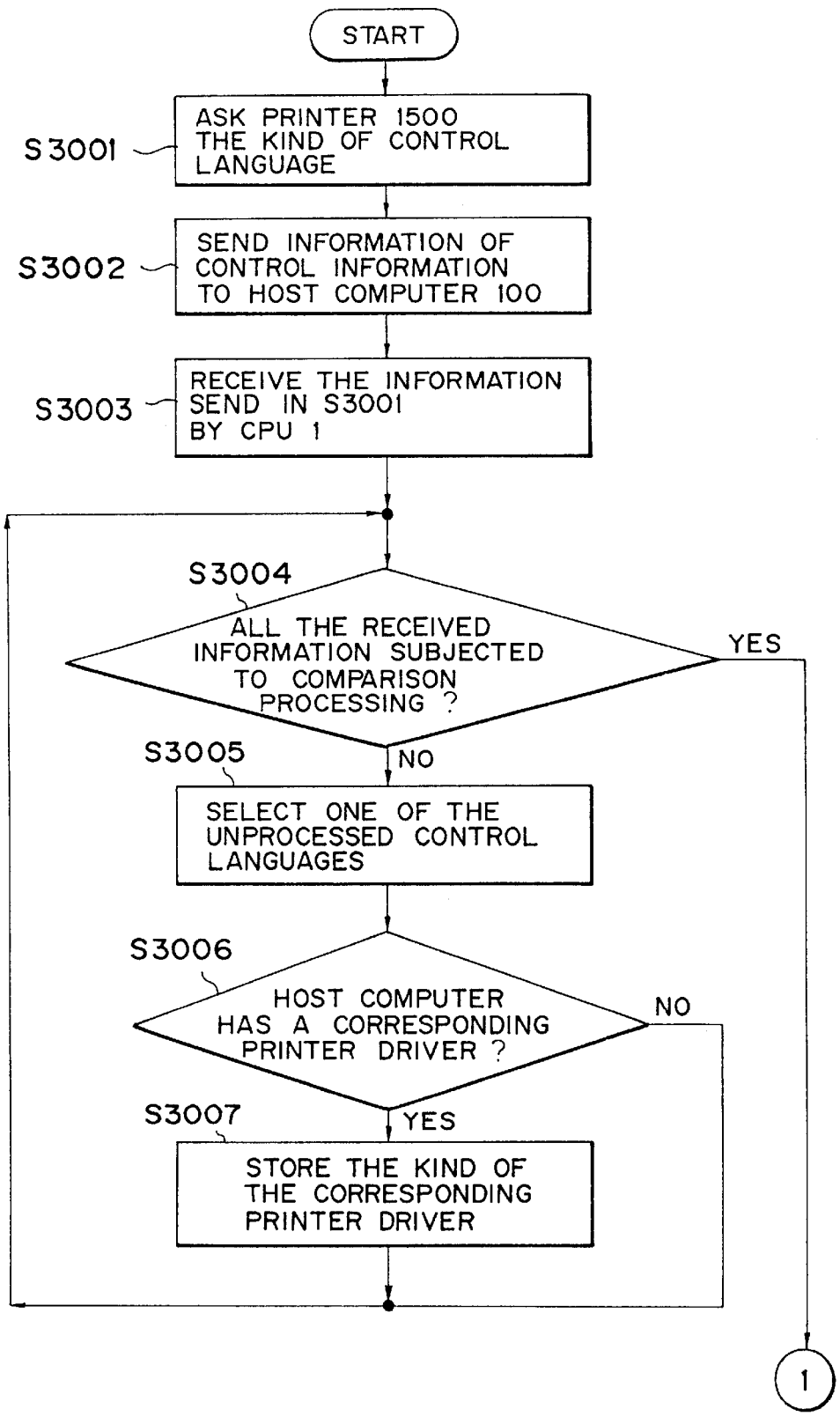
FIG. 12 is a flow chart showing an environmental setting switching sequence according to the fourth embodiment of the present invention.
Figure 13:
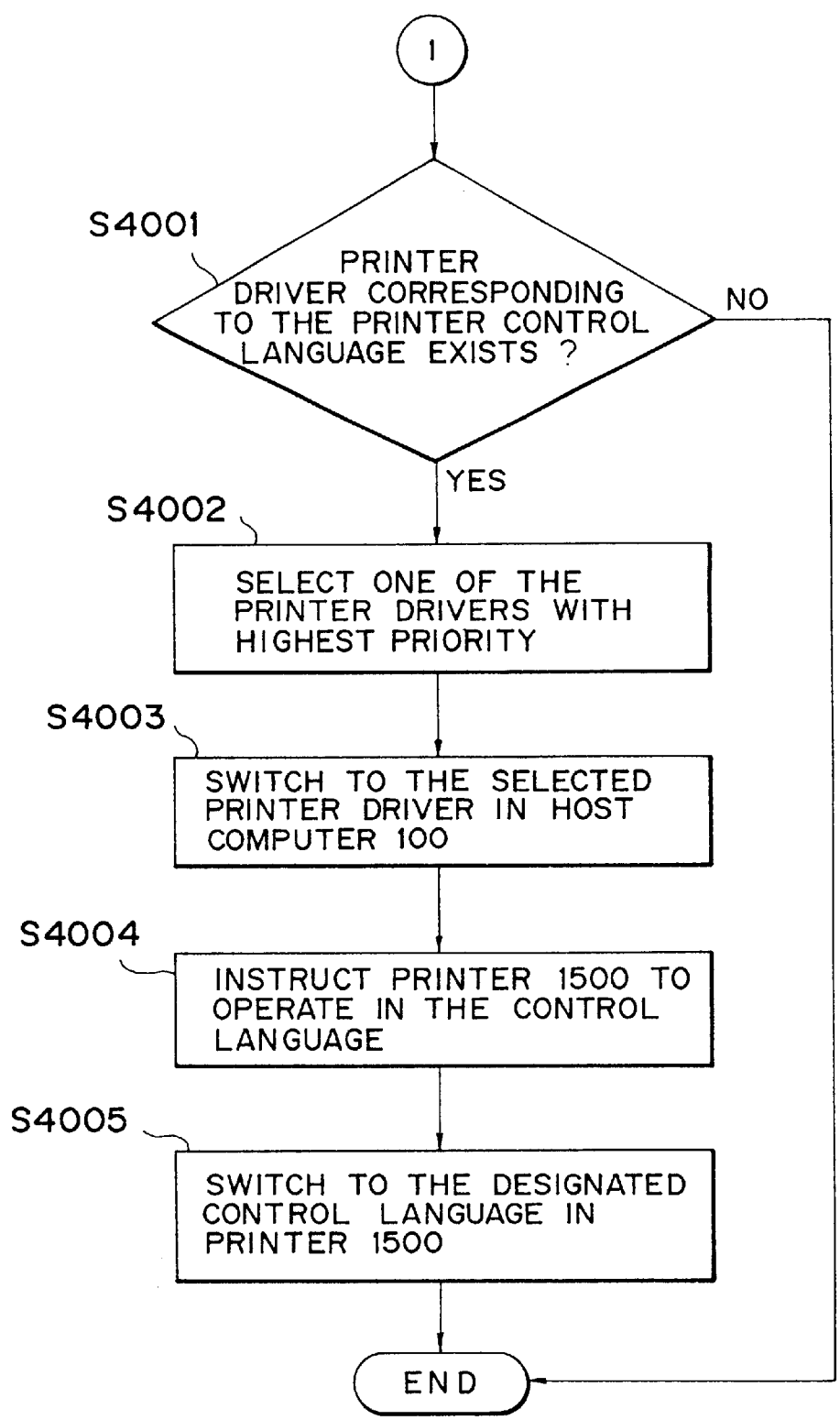
FIG. 13 is a flow chart showing an environmental setting switching sequence according to the fourth embodiment of the present invention.

FIGS. 12 and 13 are flow charts showing an environmental setting switching sequence according to the fourth embodiment of the present invention.

The processing will be described with reference to the block diagram shown in FIG. 4 for explaining the environmental setting switching processing performed between the host computer 100 and the printer 1500.

Note that the priority order of a plurality of printer drivers used in the host computer 100 may be fixed beforehand and stored in, e.g., a ROM 2, or a given priority order may be set by using a keyboard 9 or a pointing device (not shown) and stored in, e.g., a RAM 3.

Referring to FIG. 12, in step S3001, a CPU 1 in the host computer 100 asks the printer 1500 the kind of printer control language to which the printer 1500 corresponds, and the flow advances to step S3002.

In step S3002, a CPU 14 in the printer 1500 sends to the host computer 100 the printer control language to which the printer 1500 corresponds, and the flow advances to step S3003. If the printer 1500 corresponds to a plurality of printer control languages, the CPU 14 of the printer 1500 sends information of a plurality of printer control languages to the host computer 100 at one time.

In step S3003, the host computer 100 receives the information sent in step S3002 from the CPU 14 of the printer 1500, and the flow advances to step S3004.

In step S3004, the CPU 1 of the host computer 100 checks whether all the received information is subjected to processing from steps S3005 to S3007 to be described below. If NO in step S3004, the flow advances to step S3005. If YES step S3004, the flow advances to step S4001 shown in FIG. 13 through a route (1).

Note that the processing from steps S3005 to S3007 is the comparison processing explained in the first embodiment, and whether a printer driver corresponding to the printer control language information exists in the host computer 100 is determined by referring to the table (not shown) in the RAM 3 mentioned earlier in the first embodiment.

In step S3005, one of the pieces of information concerning the unprocessed printer control languages checked in step S3004 is selected as an object to be processed, and the flow advances to step S3006.

In step S3006, the CPU 1 checks on the basis of the information related to the printer control language selected in step S3005, while referring to the above-mentioned table, whether the host computer 100 has a printer driver corresponding to that printer control language. If YES in step S3006, the flow advances to step S3007. If NO in step S3006, the flow returns to step S3004.

In step S3007, the kind of printer driver corresponding to the printer control language as an object to be processed is stored, and the flow returns to step S3004. In this case, the storage of the information is performed by writing the information in an area assured in the RAM 3.

Referring to FIG. 13, in step S4001, the CPU 1 reads out the information stored in step S3004 of FIG. 12 from the RAM 3 and checks whether a printer driver corresponding to the printer control language that the printer 1500 has exists in the host computer 100. If YES in step S4001, the flow advances to step S4002. If NO in step S4001, the processing is ended.

In step S4002, the CPU 1 further checks the information stored in step S3004 of FIG. 12 and selects a printer driver with the highest priority from printer drivers corresponding to the printer control language of the printer 1500, and the flow advances to step S4003. The information of the priority order of printer drivers is stored in, e.g., the RAM 3, the ROM 2, or the hard disk 11.

In step S4003, the CPU 1 of the host computer 100 switches to the printer driver selected in step S4002 in order to perform printing by using this printer driver, and the flow advances to flow S4004.

In step S4004, in order to perform printing by using the printer control language selected in step S4002, the CPU 1 of the host computer 100 sends an instruction for switching to this printer control language to the printer 1500, and the flow advances to step S4005.

In step S4005, the CPU 14 of the printer 1500 receives the instruction sent in step S4004, switching an operating printer control language to the designated printer control language, and ending the processing.

As described-above, the matching between a printer control language to which the printer corresponds and a printer driver to which the host computer corresponds is automatically obtained in accordance with the priority order of printer drivers which is determined on the host computer side. Therefore, correct printing results can be obtained constantly.

Note that in the above third and fourth embodiments, the timing at which the printer control language information is acquired is any of the printing start timing, the timing at which the system is initialized (the power source switch is turned on), and the timing at which a user designates the execution.

In this embodiment as has been described above, switching between printer drivers is designated on the basis of the printer control language information acquired from the memory of the printer connected to the host computer through the bidirectional interface, and the corresponding printer driver environment of the host computer is set in accordance with this switching designation. Therefore, even if the printer environment of the host computer does not match that of the printer connected to allow communications between them, an optimal printer driver can be set automatically by setting the matching printer environments.

In this embodiment, as has been described above, the first printer environment data stored in the memory of the printer connected to the host computer through the bidirectional interface is acquired on the basis of the printer environmental switching status and registered as an internal file of the host computer. After this registration, the second printer environment data corresponding to the second printer environment is set in the memory of the printer, and the first printer environment data registered in the internal file is stored again in the memory of the printer on the basis of the end status of printing corresponding to the second printer environment. This makes it possible to reliably reproduce the setting status of the memory for each environment upon switching between the printer environments.

In addition, the system is arranged such that the switching between printer environments occurs when printer control language systems are switched, so the setting status of the memory of the printer for each environment can be reproduced reliably upon switching between the printer control language systems.

Even when, therefore, the host computer is connectable to a plurality of printers having different control language systems and the printer environment of the host computer does not match that of the printer connected to allow communications between them, the matching printer environments can be set automatically. This makes it possible to obtain correct printing results free from recording errors even if an operator has failed to set the printer environment. Furthermore, the printer setting information depending on a desired printer environment resident in a limited memory is resettable by the host computer. Therefore, a maximum memory area of the printer can be allocated to the printer control language system after printer environments are switched, resulting in highly efficient printing.

What is claimed is:

1. An information processing apparatus comprising:

acquiring means for acquiring identification information which specifies an interpreting program for interpreting a device control language, the interpreting program specified by the identification information being operable in an external device connected to said information processing apparatus;

discrimination means for discriminating whether a selected first control program corresponds to the device control language interpreted by the interpreting program specified by the identification information acquired by said acquiring means; and selecting means for selecting from a plurality of control programs a second control program corresponding to the device control language interpreted by the interpreting program specified by the identification information acquired by said acquiring means if said discrimination means discriminates that the selected first control program does not correspond to the device control language interpreted by the interpreting program specified by the identification information acquired by said acquiring means, wherein data is output to the external device using the second control program selected by said selecting means if it is discriminated that the first control program does not correspond to the device control language.

2. The apparatus according to claim 1, wherein a plurality of interpreting programs are operable in the external device and are given respective priorities, and wherein the interpreting program specified by the identification information is one of the plurality of interpreting programs with a highest priority.

3. The apparatus according to claim 1, wherein the plurality of control programs are given respective priorities, and the control program selected by said selecting means is one of the plurality of control programs with a highest priority.

4. The apparatus according to claim 1, wherein the external device comprises a printer and the first and second control programs comprise printer drivers to perform printing.

5. The apparatus according to claim 1, wherein the data output by said output means to the external device is described in the particular device control language.

6. An information processing method carried out in an information processing apparatus to which an external device is connected, said method comprising the steps of:

acquiring identification information which specifies an interpreting program for interpreting a device control language, the interpreting program specified by the identification information being operable in the external device;

discriminating whether a selected first control program corresponds to the device control language interpreted by the interpreting program specified by the identification information acquired in said acquiring step; and selecting from a plurality of control programs a second control program corresponding to the device control language interpreted by the interpreting program specified by the acquired identification information if it is discriminated in said discriminating step that the selected first control program does not correspond to the device control language interpreted by the interpreting program specified by the identification information acquired in said acquiring step, wherein data is output to the external device using the second control program selected in said selecting step if it is discriminated that the first control program does not correspond to the device control language.

7. The method according to claim 6, wherein a plurality of interpreting programs are operable in the external device and are given respective priorities, and wherein the interpreting program specified by the identification information is one of the plurality of interpreting programs with a highest priority.

8. The method according to claim 6, wherein the plurality of control programs are given respective priorities, and the control program selected in said selecting step is one of the plurality of control programs with a highest priority.

9. A computer-readable medium embodying computer-executable instructions for an information processing method to be carried out in an information processing apparatus to which an external device is connected, the method comprising the steps of:

acquiring identification information which specifies an interpreting program for interpreting a device control language, the particular interpreting program specified by the identification information being operable in the external device;

discriminating whether a selected first control program corresponds to the device control language interpreted by the interpreting program specified by the identification information acquired in said acquiring step; and selecting from a plurality of control programs a second control program corresponding to the device control language interpreted by the interpreting program specified by the acquired identification information if it is discriminated in said discriminating step that the selected first control program does not correspond to the device control language interpreted by the interpreting program specified by the identification information acquired in said acquiring step, wherein data is output to the external device using the second control program selected in said selecting step if it is discriminated that the first control program does not correspond to the device control language.

10. The medium according to claim 9, wherein a plurality of interpreting programs are operable in the external device and are given respective priorities, and wherein the interpreting program specified by the identification information is one of the plurality of interpreting programs with a highest priority.

11. The medium according to claim 9, wherein the plurality of control programs are given respective priorities, and the control program selected in said selecting step is one of the plurality of control programs with a highest priority.

12. The medium according to claim 9, wherein the external device comprises a printer and the first and second control programs comprise printer drivers to perform printing.

13. An information processing apparatus comprising:

acquiring means for acquiring identification information which specifies a device control language, the device control language being interpreted by an external apparatus;

discrimination means for discriminating whether a selected first program corresponds to the device control language specified by the identification information acquired by said acquiring means; and selection means for selecting from a plurality of programs a second program corresponding to the device control language specified by the identification information acquired by said acquiring means if said discrimination means discriminates that the selected first program does not correspond to the device control language specified by the identification information acquired by said acquiring means.

14. The apparatus according to claim 13, further comprising transmission means for transmitting to the external apparatus a command for requesting the identification information.

15. The apparatus according to claim 14, further comprising detection means for detecting switching of a printer control language in a printer, wherein said transmission means transmits the command in response to said detection means detecting the language switching.

16. The apparatus according to claim 14, wherein said transmission means transmits the command in response to starting of a printing operation.

17. The apparatus according to claim 14, wherein said transmission means transmits the command in response to starting of said apparatus.

18. The apparatus according to claim 13, wherein the first and second programs comprise printer drivers to perform printing.

19. The apparatus according to claim 13, further comprising setting means for setting a program environment corresponding to the selected first program or the second program selected by said selection means if it is discriminated that the first program does not correspond to the device control language.

20. The apparatus according to claim 13, wherein said selection means does not make a program selection if said discrimination means discriminates that the selected first program corresponds to the device control language specified by the identification information.

21. The apparatus according to claim 13, further comprising memory means for storing information indicative of correspondence between the device control language and the first and second programs.

22. The apparatus according to claim 13, wherein the external apparatus comprises a printer.

23. An information processing method carried out in an information processing apparatus to which an external device is connected, said method comprising the steps of:

acquiring identification information which specifies a device control language, the device control language being interpreted by the external apparatus;

discriminating whether a selected first program corresponds to the device control language specified by the acquired identification information; and selecting from a plurality of programs a second program corresponding to the device control language specified by the acquired identification information, if it is discriminated in said discriminating step that the selected first program does not correspond to the device control language specified by the identification information acquired in said acquiring step.

24. The method according to claim 23, further comprising transmitting to the external apparatus a command for requesting the identification information.

25. The method according to claim 24, further comprising detecting switching of a printer control language in a printer, wherein in said transmitting step the command is transmitted in response to detection of the language switching.

26. The method according to claim 24, wherein in said transmitting step the command is transmitted in response to starting of a printing operation.

27. The method according to claim 24, wherein in said transmitting step the command is transmitted in response to starting of said apparatus.

28. A computer-readable medium embodying computer-executable instructions for an information processing method to be carried out in an information processing apparatus to which an external device is connected, the method comprising the steps of:

acquiring identification information which specifies a device control language, the device control language being interpreted by the external apparatus;

discriminating whether a selected first program corresponds to the device control language specified by the acquired identification information; and selecting from a plurality of programs a second program corresponding to the device control language specified by the acquired identification information if it is discriminated in said discriminating step that the selected first program does not correspond to the device control language specified by the identification information acquired in said acquiring step.

29. The medium according to claim 28, the embodied method further comprising transmitting to the external apparatus a command for requesting the identification information.

30. The medium according to claim 29, the embodied method further comprising detecting switching of a printer control language in a printer, wherein in said transmitting step the command is transmitted in response to detection of the language switching.

31. The medium according to claim 29, wherein in said transmitting step the command is transmitted in response to starting of a printing operation.

32. The medium according to claim 29, wherein in said transmitting step the command is transmitted in response to starting of said apparatus.

33. The medium according to claim 28, the embodied method further comprising a step of setting a program environment corresponding to the selected first program or the second program selected in said selecting step if it is discriminated that the first program does not correspond to the device control language.

34. The medium according to claim 28, wherein said selecting step is not executed if it is discriminated in the discriminating step that the selected first program corresponds to the device control language specified by the identification information.

35. The medium according to claim 28, the embodied method further comprising storing information indicative of a correspondence between the device control language and the first and second programs.

36. The medium according to claim 28, wherein the external apparatus, from which the identification information is acquired in the acquiring step, comprises a printer.

37. A computer-executable program for an information processing method to be carried out in an information processing apparatus to which an external device is connected, the method comprising the steps of:

acquiring identification information which specifies an interpreting program for interpreting a device control language, the interpreting program specified by the identification information being operable in the external device;

discriminating whether a selected first control program corresponds to the device control language interpreted by the interpreting program specified by the identification information acquired in said acquiring step; and selecting from a plurality of control programs a second control program corresponding to the device control language interpreted by the interpreting program specified by the acquired identification information if it is discriminated in said discriminating step that the selected first control program does not correspond to the device control language interpreted by the interpreting program specified by the identification information acquired in said acquiring step, wherein data is output to the external device using the second control program selected in said selecting step if it is discriminated that the first control program does not correspond to the device control language.

38. A computer-executable program for an information method to be carried out in an information processing apparatus to which an external device is connected, the method comprising the steps of:

acquiring identification information which specifies a device control language, the device control language being interpreted by the external apparatus;

discriminating whether a selected first program corresponds to the device control language specified by the acquired identification information; and selecting from a plurality of programs a second program corresponding to the device control language specified by the acquired identification information, if it is discriminated in said discriminating step that the selected first program does not correspond to the device control language specified by the identification information acquired in said acquiring step.

* * * * *

UNITED STATES PATENT AND TRADEMARK OFFICE
CERTIFICATE OF CORRECTION

PATENT NO. : 6,667,812 B1
DATED : December 23, 2003
INVENTOR(S) : Nobuhiko Sato et al.

It is certified that error appears in the above-identified patent and that said Letters Patent is hereby corrected as shown below:

<u>Column 4,</u>
Line 44, "100." should read -- 100 --.

<u>Column 5,</u>
Line 17, "disk." should read -- disk --.

<u>Column 10,</u>
Line 30, "Alternatiyely," should read -- Alternatively, --.

<u>Column 12,</u>
Line 28, "step" (third occurrence) should read -- in step --.

<u>Column 13,</u>
Line 14, "described-above," should read -- described above, --.

Signed and Sealed this

Second Day of May, 2006

JON W. DUDAS
*Director of the United States Patent and Trademark Office*